UNITED STATES PATENT OFFICE.

JULES F. VERVOORT, OF LOS ANGELES, CALIFORNIA, ASSIGNOR OF ONE-HALF TO LEE D. McJILTON, OF LOS ANGELES, CALIFORNIA.

GASKET-SEALING COMPOSITION.

1,341,952.     Specification of Letters Patent.     Patented June 1, 1920.

No Drawing.     Application filed April 21, 1919. Serial No. 291,745.

*To all whom it may concern:*

Be it known that I, JULES F. VERVOORT, a citizen of the United States, residing at Los Angeles, in the county of Los Angeles and State of California, have invented new and useful Improvements in Gasket-Sealing Compositions, of which the following is a specification.

My invention relates to a sealing composition, especially suited to be used with gaskets.

It is an object of this invention to provide an inexpensive and efficient sealing composition, which is water and oil proof, and adapted for sealing joints in which paper, rubber or metal gaskets are used.

My invention consists in the composition hereinafter described and claimed, and the process of making the same.

I take rosin and heat the same in a suitable vessel, gradually raising the temperature above the melting point until the rosin begins to boil and foam. I keep the rosin boiling for a considerable time, stirring the same in order to prevent burning, until the whole mass of rosin is of a very dark and almost black color. I now discontinue any further heating of the rosin and add benzol thereto, stirring the mixture, then the benzol will quickly dissolve the rosin, forming therewith a composition which has the appearance and consistency of New Orleans molasses. The rosin and benzol being mixed in the proportion of 12 parts of rosin and 10 parts of benzol by weight.

The boiling of the rosin up to the point where the same turns black effects a chemical change in the rosin, the exact nature of which I cannot explain. However, it causes the resulting composition to form an extremely adhesive substance which will adhere to wood, paper, rubber, or metal, such as copper gaskets, and form a sealing composition which is water and oil proof. It is superior to the ordinary rubber compositions on the market for such purposes, as rubber compositions will not adhere properly to metal surfaces and are easily rubbed off.

If the composition requires thinning down, benzol may be added, or alcohol, either methyl or ethyl alcohol.

I claim:

1. A sealing composition for gaskets and the like, comprising rosin which has been subjected to heating until it has turned a dark color, and a volatile solvent for the same.

2. A sealing composition for gaskets and the like comprising rosin which has been boiled until it has turned a dark color, and benzol.

3. A sealing composition for gaskets and the like, containing rosin which has been boiled until it has turned a dark color, and benzol, in the proportion of 12 parts of rosin and 10 parts of benzol.

4. A method of making a sealing composition for gaskets and the like, comprising heating rosin until its boils, continuing the boiling until it turns a dark color, and dissolving the rosin in a solvent in the proportion of 12 parts of the resinous body to 10 parts of the solvent.

In testimony whereof I have signed my name to this specification.

J. F. VERVOORT.